United States Patent Office 3,327,617
Patented June 27, 1967

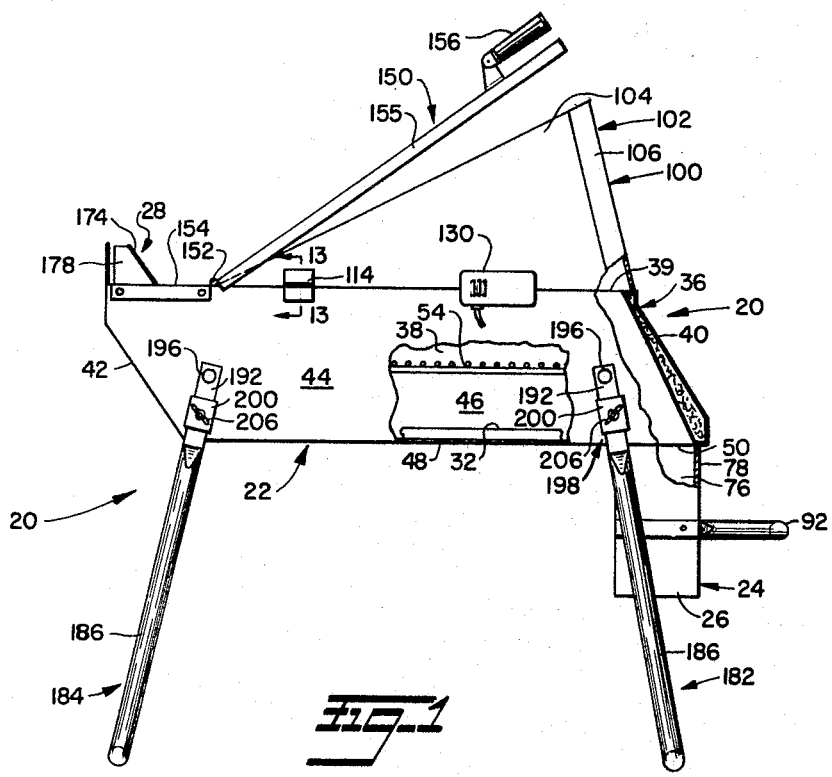
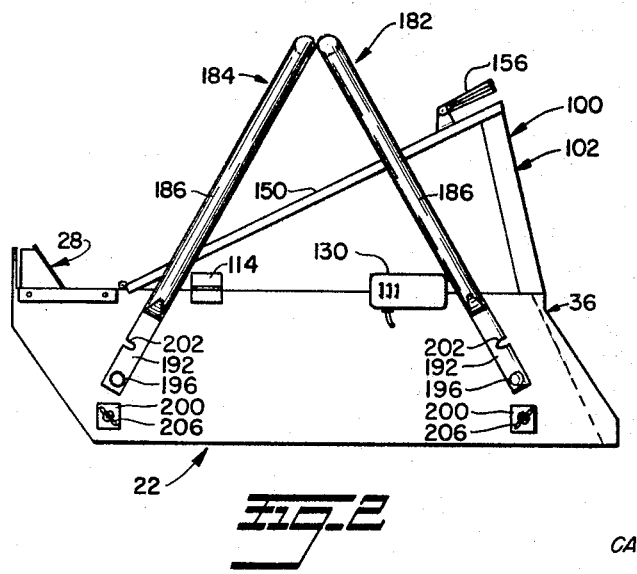

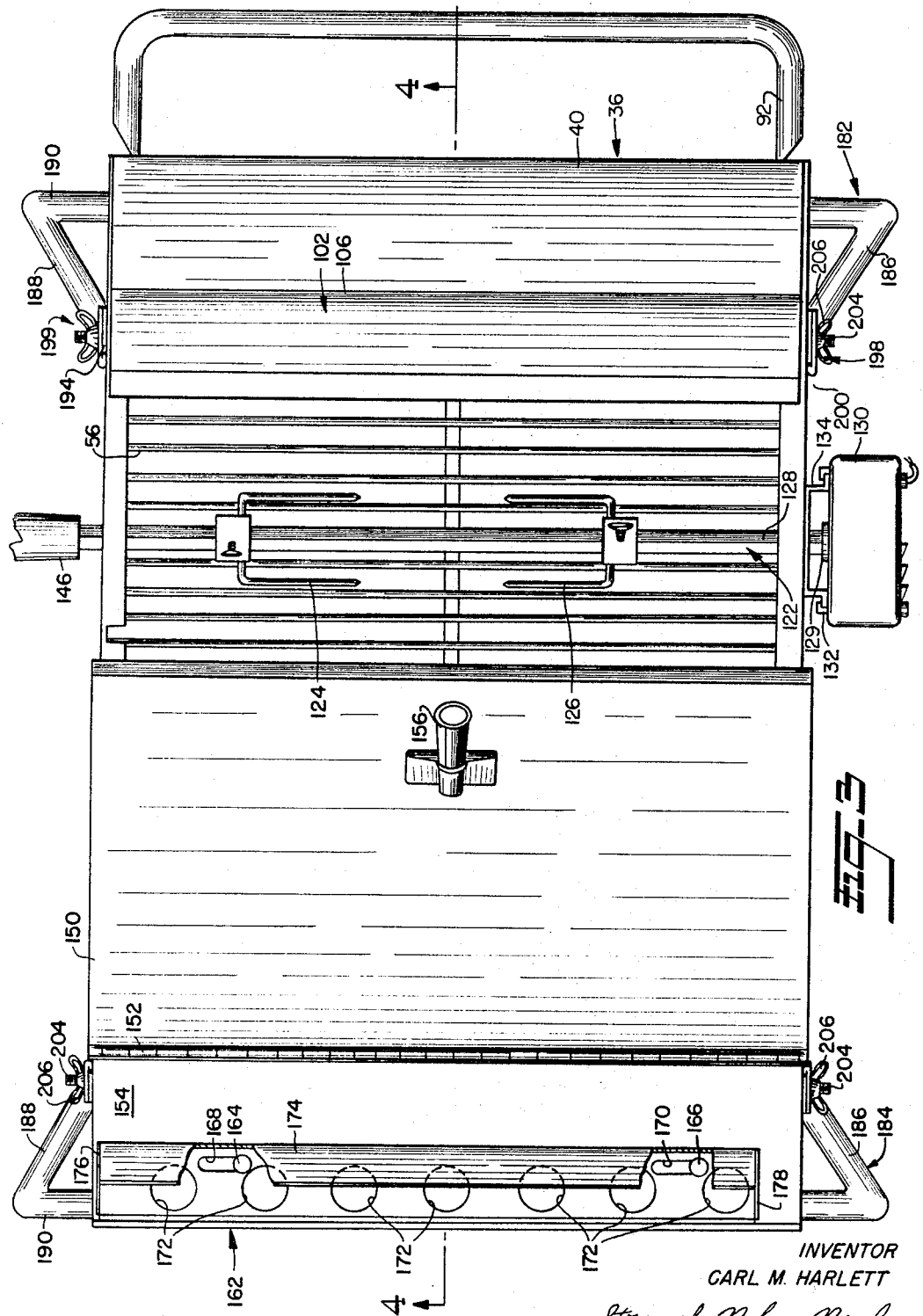

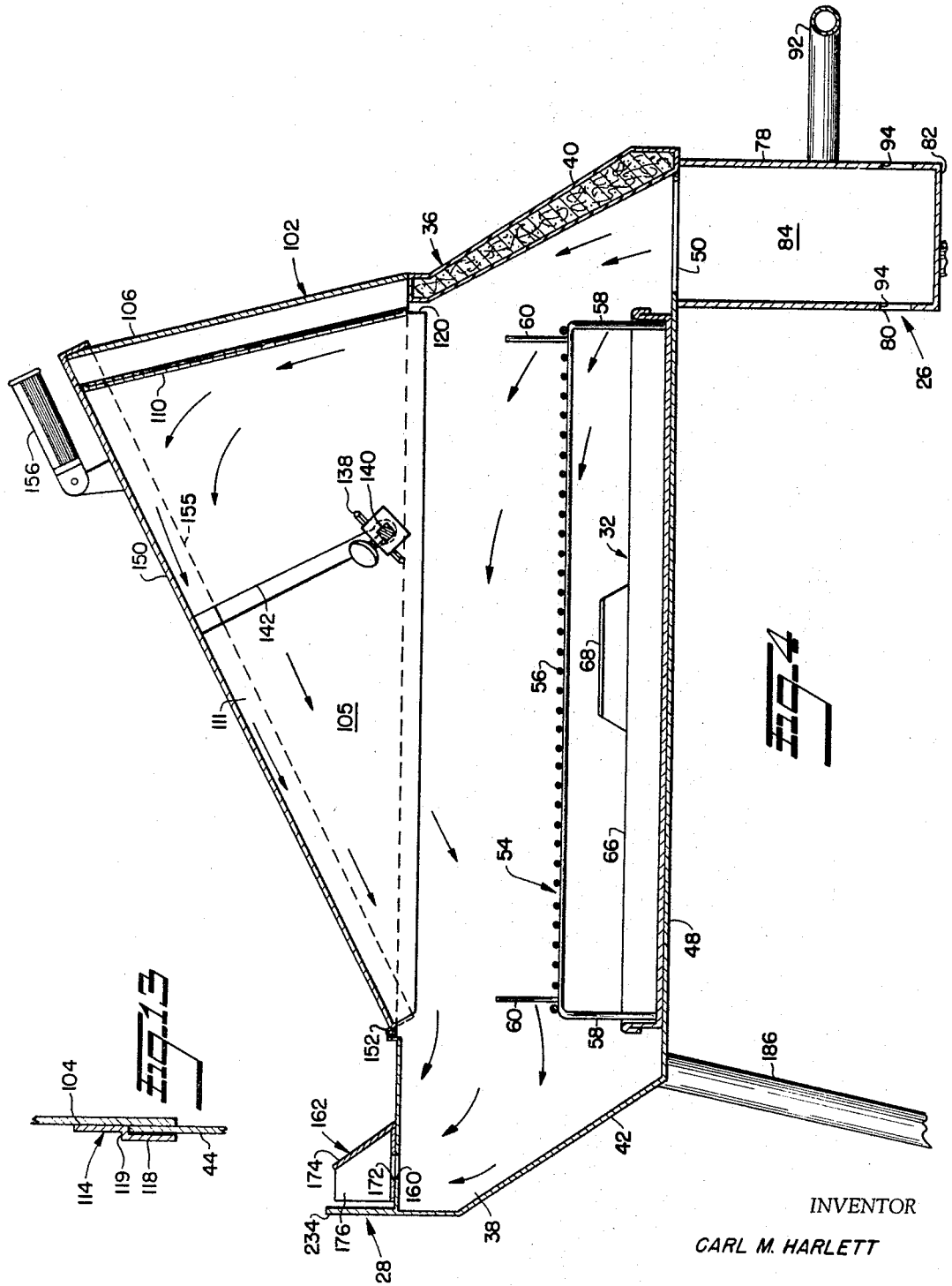

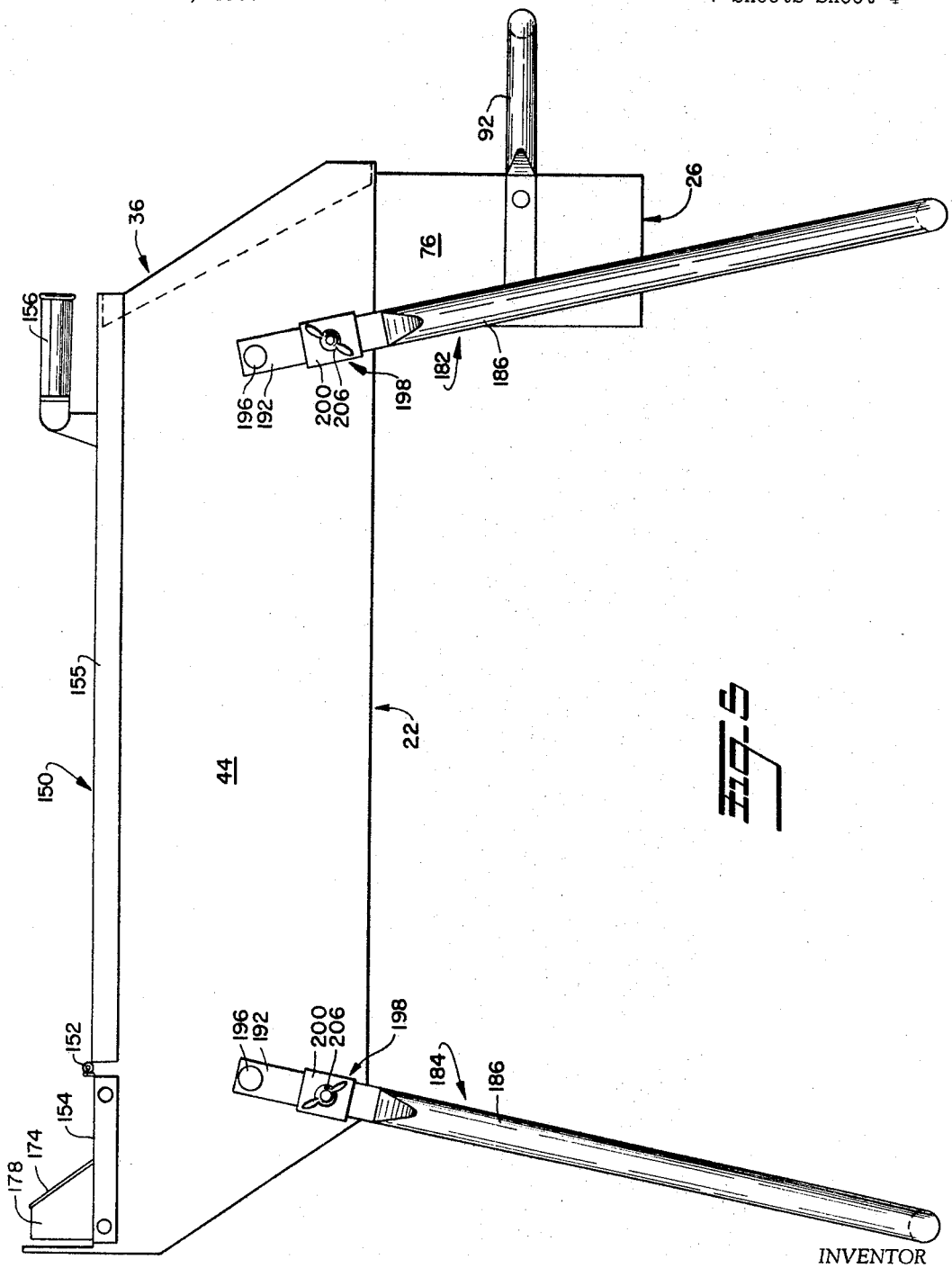

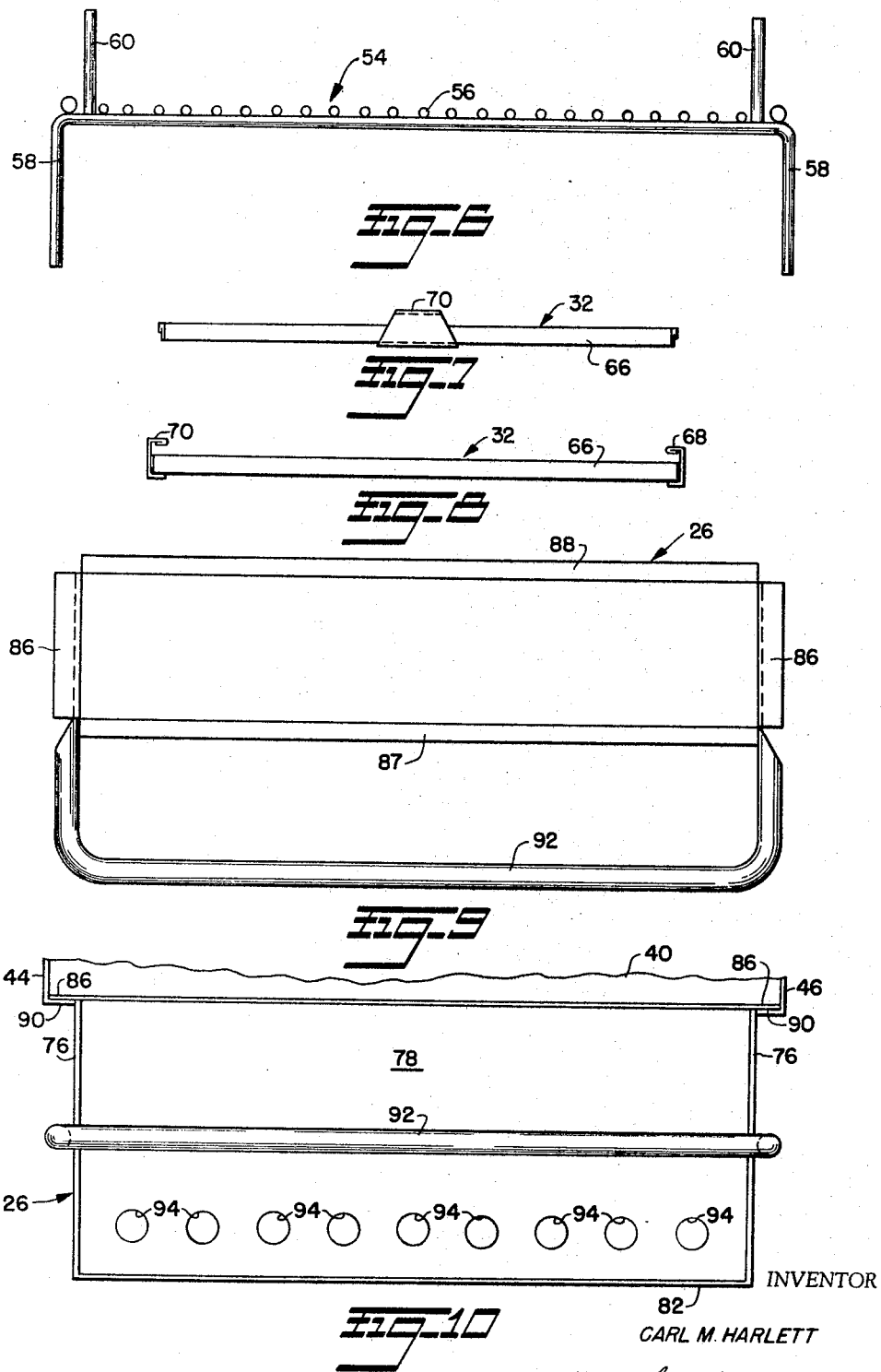

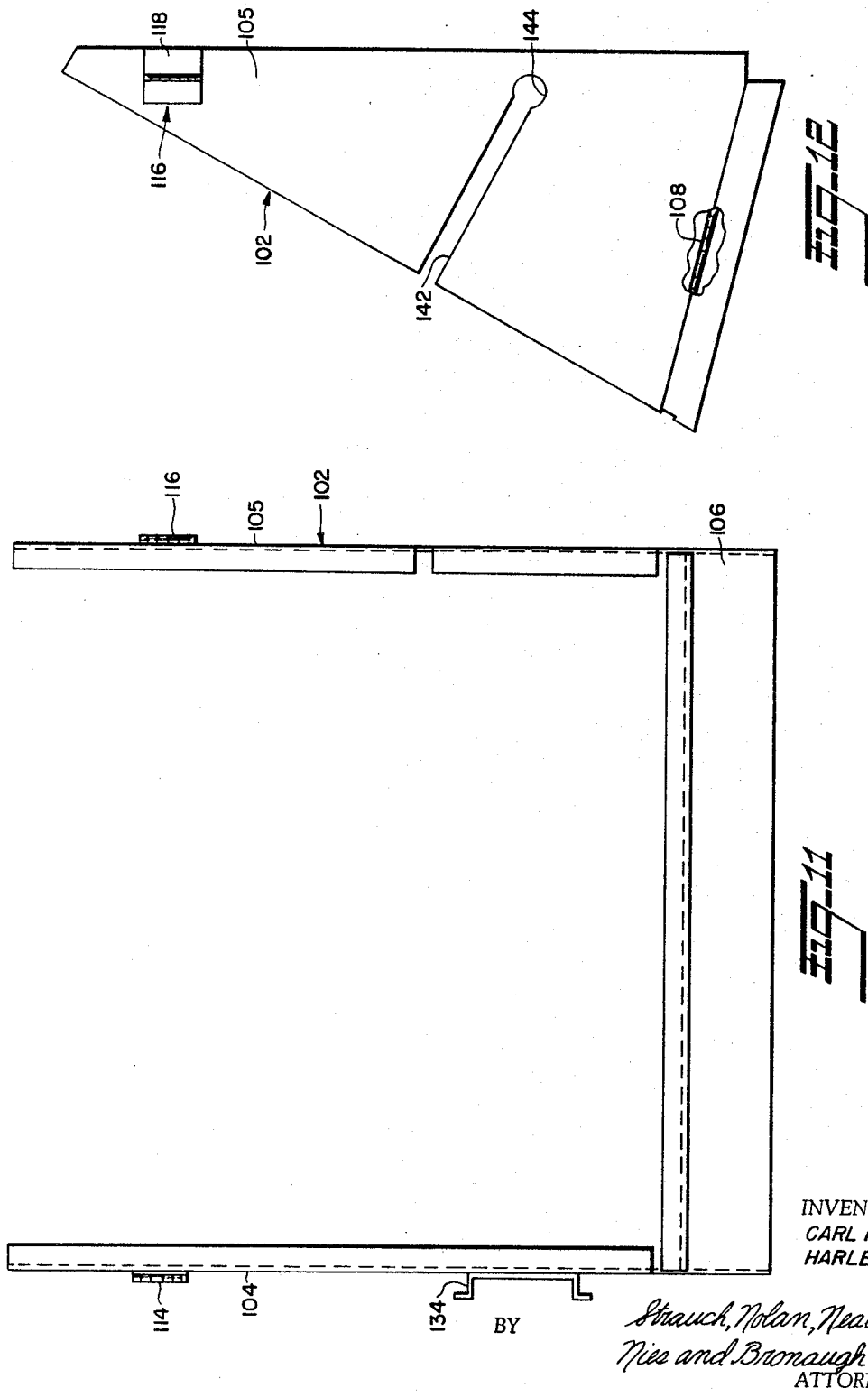

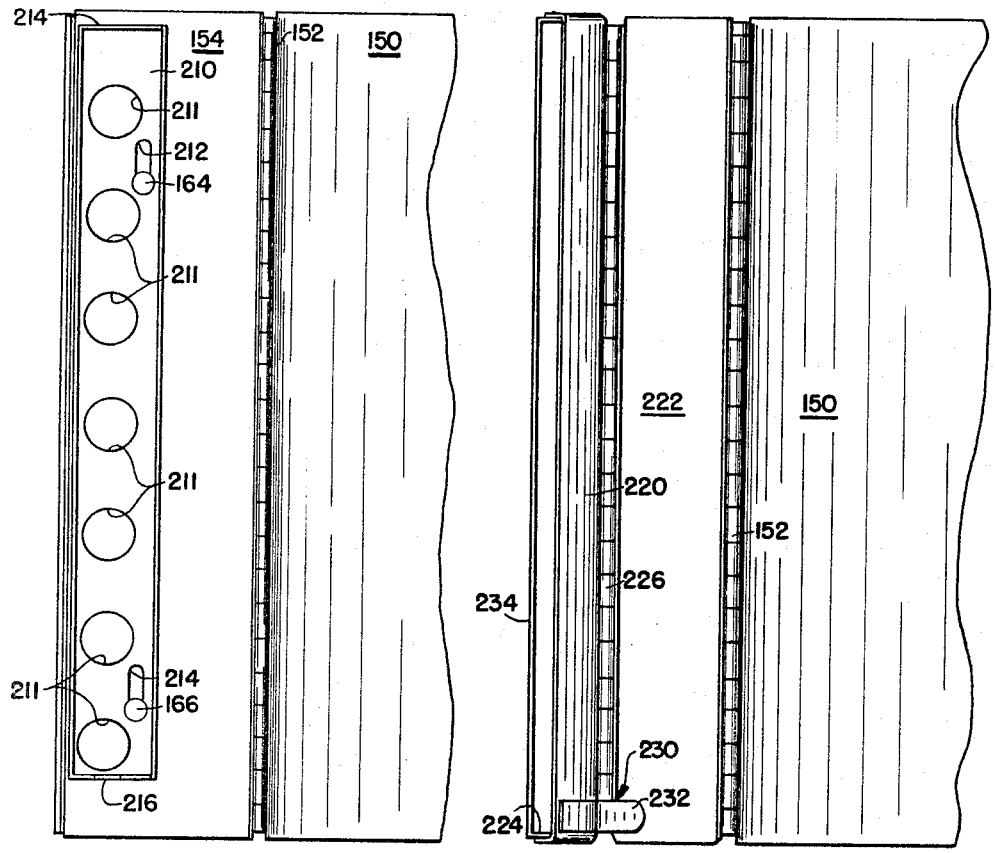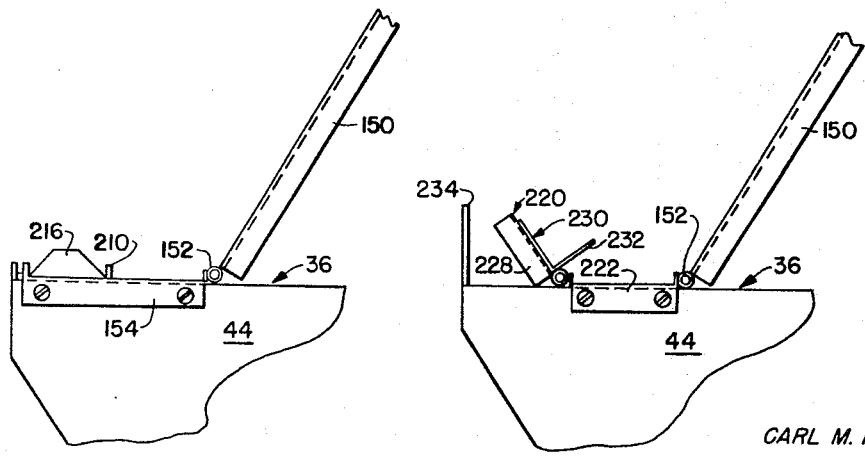

3,327,617
BARBECUE APPARATUS
Carl M. Harlett, Tiffin, Ohio, assignor to The Tiffin Art Metal Company, Tiffin, Ohio, a corporation of Ohio
Filed Mar. 3, 1965, Ser. No. 436,812
19 Claims. (Cl. 99—340)

This invention relates to barbecue apparatus. More particularly, the present invention relates to a novel barbecue and rotisserie apparatus of the indirect type wherein the food to be prepared is not presented directly over the fire.

Comestibles (generally meats) are conventionally barbecued on racks placed directly above a firebox adapted to contain charcoal or other fuel or an electrical heating element. In some cases, the food supporting rack and firebox are enclosed to confine the combustion products generated during the barbecuing process to intimately contact the food to be prepared.

In conventional barbecue apparatus of the type just described, grease drippings resulting from cooking meat drips down into the fire or onto the heating element, creating a number of serious problems. One of the most important of these is that of keeping the apparatus clean. Part of the grease rendered from the meat being cooked congeals in the firebox itself, necessitating frequent cleaning of the latter. This is a difficult, arduous, messy task and tends to discourage the use of such apparatus.

Other portions of the grease are vaporized or burned by the fire or heating element and converted into a heavy oily smoke which rises through the apparatus and settles out on the interior of the apparatus in the form of greasy deposits which become even more pernicious by the entrapment of fly ash and other foreign substances. Such deposits must be promptly removed as they are unsanitary and pose a serious threat.

The burning grease also poses a fire hazard because of "flare-ups" of the grease as it drips onto the burning fuel or hot heating element, vaporizes, and ignites. The danger of fire from flare-ups is sufficiently great that a person frequently must watch the barbecue oven to prevent a fire from starting.

Another disadvantage of flare-ups is that the flame of the burning grease and its combustion products contact and scorch and otherwise affect the taste of the meat. Such meat has a distinctly inferior taste in comparison to that which is not contacted with flame or greasy combustion products during cooking and which does not have the scorched, greasy taste of meat barbecued in conventional apparatus. There is also substantial evidence that the combustion products resulting from the burning of the grease and deposited on the meat being barbecued contain significant amounts of carcinogenous (i.e., cancer causing) chemicals (see page 24 of the July 4, 1964 issue of the Washington Daily News). Thus, meat barbecued in conventional apparatus may be extremely dangerous to eat as well as being inferior in taste, texture, and color. In addition, an objectionable black crust often is formed on meat especially in barbecue apparatus where the meat is cooked directly over the fire.

Another disadvantage of conventional forms of barbecuing equipment is that their construction is so bulky and cumbersome to handle that they are not easily and conveniently transported from one place to another. Also, present-day barbecue apparatus especially of the portable type are not conveniently equipped to roast meats and other comestibles on a rotisserie in addition to cooking food on a grill.

The present invention, in overcoming the foregoing problems, contemplates and has as one of its major objects the provision of a novel barbecue apparatus which employes both convected heat and radiation to prepare food in such a manner that the food is not supported directly over the fire and the grease drippings are collected without permitting them to enter the firebox. As a result, (1) no fat flame-ups occur from grease drippings, (2) meat may be finished to any desired stage without forming the objectionable black crust produced in preparing foods with the type of conventional barbecuing equipment previously mentioned, and (3) the meat is rapidly sealed during the cooking process to retain its natural juices and moisture.

In fulfilling the foregoing object, the firebox and cooking compartment in which the food to be prepared is supported is enclosed by a casing and the meat is cooked by heated air which is drawn by induction through fuel in the firebox. By drawing outside air through fuel, such as charcoal, the oxygen content is burned out with the result that the heated gases enter and fill the enclosed cooking compartment. Owing to the lack of sufficient oxygen in the cooking compartment, combustion other than the fire in the firebox is substantially prevented, thus eliminating the hazard of flame-ups.

By preventing flame-ups and vaporization and burning of grease drippings, the barbecue apparatus of this invention is considerably easier to keep clean than conventional barbecuing equipment since grease does not deposit on the firebox and the interior walls of the cooking compartment.

Another important object of this invention is to improve the versatility of the barbecue apparatus just described by providing a novel rotisserie which is in the form of an attachment unit and which is capable of being easily and quickly mounted in its operating position or removed from the barbecue apparatus when it is desired to prepare food on a grill.

In accordance with this invention the removable rotisserie unit is formed to cooperate with the casing of the barbecue apparatus to maintain the cooking area enclosed with the result that hot, relatively oxygen-free gases circulate intimately around the meat and combine with the radiant heat produced by the burning fuel in the firebox to quickly seal spit-supported meat. Owing to this construction, rotisserie cooking is accomplished quickly and with superior results.

Further in accordance with this invention, the rotisserie unit is mounted directly above the grill area of the barbecue apparatus, enabling the grease drippings to be collected and to be drained off without permitting them to enter the firebox or to contact the flames produced by burning fuel in the firebox. Objectionable fat flame-ups thus are prevented to eliminate fire hazards and to improve the flavor, texture, and color of meat prepared in the rotisserie of this invention.

Another object of this invention is to provide a novel barbecue firebox which is readily removable from the barbecue apparatus to render the starting and extinguishment of a fire easier and quicker in comparison with conventional type of fireboxes which are normally fixed in place. In addition, the firebox of this invention is so constructed as to promote a strong draft through the combustion chamber, thus enabling exceptionally fast starting of a fire.

Still another object of this invention is to provide a barbecue apparatus that has a novel grill which is reversible to make two different cooking heights available for preparing different cuts of meats or other food.

A further object of this invention is to provide a novel construction whereby various components of the barbecue apparatus and rotisserie unit are easily removable for cleaning. The major components that are capable of being easily removed according to this invention are the grill, the firebox, a drip tray for collecting the grease drippings and the rotisserie motor, spit rod, and forks.

Still a further object of this invention is to provide a novel barbecue apparatus which is easily portable and capable of being conveniently and quickly set up at different locations.

In fulfilling the foregoing object, the barbecue apparatus of the present invention is provided with hinged legs that may be rotated and provide carrying handles similar to that of a picnic basket.

Further objects of this invention will appear as the description proceeds in connection with the appended claims and the annexed drawings wherein:

FIGURE 1 is a side elevation of the apparatus constructed according to the principles of the present invention and incorporating the rotisserie attachment unit with portions of the casing broken away to illustrate interior details;

FIGURE 2 is a side elevation similar to that of FIGURE 1 but showing the support legs for the apparatus swung to upwardly extending positions to render the apparatus of this invention conveniently portable;

FIGURE 3 is a top plan view of the apparatus illustrated in FIGURE 1;

FIGURE 4 is a longitudinal section taken substantially along lines 4—4 of FIGURE 3;

FIGURE 5 is a side elevation of the apparatus of this invention with the rotisserie attachment unit removed;

FIGURE 6 is a front elevation of the food supporting grill shown in FIGURE 1;

FIGURE 7 is a side elevation of the grease collecting tray illustrated in FIGURE 1;

FIGURE 8 is a front elevation of the tray shown in FIGURE 7;

FIGURE 9 is a top plan view of the firebox illustrated in FIGURE 1;

FIGURE 10 is a fragmentary, enlarged, front elevation of the apparatus shown in FIGURE 1 and illustrating details of the firebox illustrated in FIGURE 9;

FIGURE 11 is a top plan view of the rotisserie casing illustrated in FIGURE 1;

FIGURE 12 is a side elevation of the casing illustrated in FIGURE 11;

FIGURE 13 is an enlarged section taken substantially along lines 13—13 of FIGURE 1;

FIGURE 14 is a fragmentary top plan view illustrating a modified damper assembly for the apparatus of this invention;

FIGURE 15 is a fragmentary side elevation of the structure illustrated in FIGURE 14;

FIGURE 16 is a fragmentary top plan view illustrating still another embodiment of a draft assembly for the apparatus of this invention; and FIGURE 17 is a fragmentary side elevation of the structure illustrated in FIGURE 16.

Referring now to the drawings and more particularly to FIGURE 1, the reference numeral 20 generally designates a barbecue apparatus constructed in accordance with the principles of the present invention and comprising a cooking unit 22 and a heating unit 24. Heating unit 24 comprises a removable firebox 26 which is supported from cooking unit 22 at the bottom and to one side of the cooking unit. A natural draft controlled by a damper assembly 28 circulates air upwardly through firebox 26 to furnish oxygen for combustion. Gaseous combustion products resulting from burning fuel, such as, for example, charcoal briquettes disposed in firebox 26 is drawn into cooking unit 22. Damper assembly 28 is mounted on the top of cooking unit 22 adjacent the rearward end thereof opposite from firebox 26 to cause the combustion products to flow upwardly and rearwardly through the cooking unit to cook meat or other comestibles.

In a manner to be described in greater detail later on, grease produced by cooking the meat drips into a pan 32 at the bottom of cooking unit 22, thus preventing the drippings from entering firebox 26 and contacting the burning fuel. As discussed above, this feature of the present invention is of substantial importance since it eliminates the fire hazard encountered with conventional barbecuing equipment and the like, thus rendering the apparatus of this invention much easier to clean in addition to improving the taste and quality of the cooked meat.

With continued reference to FIGURE 1, cooking unit 22 comprises a box-shaped casing 36 which defines an oven or cooking chamber 38. Casing 36 is formed with an open top 39 and has an insulated, imperforate front wall 40 and an imperforate back wall 42 which are rigidly joined together by parallel, spaced-apart imperforate side walls 44 and 46 to provide chamber 38 with a generally rectangular shape. Pan 32 is removably seated on a flat bottom wall 48 which extends from the rearward edge of firebox 26 to the lower edge of back wall 42. A generally rectangular opening 50 formed in bottom wall 48 aligns with the open top of firebox 26 to permit upwardly flowing combustion products to enter and flow through cooking chamber 38.

As best shown in FIGURE 4, a removable grill 54 disposed in chamber 38 and having a rectangular rack 56 for supporting meat or other comestibles to be cooked is provided with four parallel legs which are indicated at 58 and which are fixed to the four corners of rack 56. Legs 58 are non-attachably seated on the flat bottom wall surface of pan 32 to horizontally support rack 56 vertically above pan 32. Firebox 26 thus is supported below and to one side of rack 56. Grill 54 is dimensioned so that it can be vertically lifted through the top opening in casing 36 for removal from the apparatus.

As best shown in FIGURE 6, grill 54 is provided with an additional set of parallel legs 60 respectively extending from the corners of rack 56 in the opposite direction from legs 58. By inverting grill 54, rack 56 may be supported above pan 32 by legs 60. Legs 58 and 60 are parallel and are conveniently formed from rigid rods. Legs 60 are uniformly formed with shorter lengths than legs 58 to support rack 56 at a correspondingly lower height above pan 32. This lower height is preferably fixed at about 3½" for cooking thick foods such as spareribs. Foods such as hamburgers, frankfurters and steak, and other food items which are not exceptionally thick, on the other hand, are preferably cooked at a greater height above pan 32. Thus, the lengths of legs 58 are made approximately an inch greater than that of legs 60 to provide the additional height.

As shown in FIGURES 4, 7, and 8, pan 32 is provided with upstanding side and end walls 66 which are of sufficient height to collect the grease drippings from the meat being cooked on grill 54. Pan 32 and grill 54 are disposed rearwardly of opening 50, thus preventing the entry of the grease drippings into firebox 26 as previously described. This feature of the present invention prevents flame-ups and sooting or smoking of the food with burning fats and liquids. Handles 68 and 70 respectively fixed to opposite sides of tray 32 permit tray 32 to be conveniently and easily lifted through the top opening in casing 36 after grill 54 is removed.

As shown in FIGURES 1, 4, 9, and 10, firebox 26 is open at the top and is formed with imperforate side plates 76 which are rigidly joined together by a front plate 78, a back plate 80 and an imperforate bottom plate 82. Plates 76, 78, 80, and 82 cooperate to define an upwardly opening combustion chamber 84 which is essentially rectangular in cross section. The top marginal edges of side plates 76, front plate 78, and rear plate 80, as best shown in FIGURE 9, are turned outwardly to respectively form flanges 86, 87, and 88. To support firebox 26 from casing 36, flanges 86 are slidably seated on inwardly turned flanges 90 formed rigid with and extending along the lower marginal edges of side walls 44 and 46. With this construction it is clear that firebox 26 depends from bottom wall 48 of casing 36 and is slidable along flanges 90, Thus, it will be appreciated that firebox 26 is quickly and easily removable from the apparatus of this invention simply by sliding it forwardly from the position shown until flanges 86 clear flanges 90.

Removably supporting firebox 26 from casing 36 is especially advantageous to enable a person to quickly start a charcoal fire and, following usage of the apparatus, to extinguish the fire in addition to dumping or wetting down the hot coals. A U-shaped, rigid, tubular handle 92 is fixed at opposite ends to side plates 76 of firebox 26 and extends forwardly from front wall 78 to simplify the handling of firebox 26 in slidably removing and re-inserting it. To provide the proper draft for burning fuel, such as charcoal, and to obtain an intense heat, each of the plates 78 and 80 is formed with a horizontal row of uniformly spaced apart apertures 94 which are preferably of the same area and which are disposed at the lower end of firebox 26 adjacent to bottom plate 82.

To start a fire, firebox 26 is removed from the apparatus and filled with fuel, such as charcoal briquettes, to the proper thickness. The charcoal briquettes are then ignited by applying lighter fuel or the like in the usual manner. After the lighter fuel has burned off and the charcoals begin to glow, additional briquettes are added and the firebox is re-inserted into its position shown in the drawings.

In accordance with the present invention, a rotisserie 100 in the form of an attachment unit is, as best shown in FIGURES 1 and 4, adapted to be removably mounted on top of cooking unit 22. Rotisserie 100 comprises a pie-shaped casing 102 (see FIGURES 1, 4, 11, and 12) having parallel, spaced apart, triangularly shaped, flat-sided, imperforate side walls 104 and 105 which extend rearwardly from and are secured to an imperforate front wall 106 by hinges 108 (FIGURE 12) and 110 (FIGURE 4). Hinges 108 and 110 may be of any conventional, suitable form to enable side walls 104 and 105 to be swung about parallel axes relative to front wall 106. Since the details of these hinges are not required for a complete understanding of this invention, further description thereof is not considered necessary. With this hinged construction, casing 102, when removed from the apparatus, may be folded about the parallel axes defined by hinges 108 and 110 to reduce the storage space needed to accommodate rotisserie 100 in a manner to be described in greater detail later on. Casing 102 is open at the top and bottom and delimits a rotisserie cooking chamber 111 shown in FIGURE 4. Casings 36 and 102 are advantageously made from sheet metal of suitable gauge to resist distortion of heat produced by burning fuel in firebox 26.

As best shown in FIGURES 1, 11, and 12, casing 102 is separately supported and positioned on casing 36 by rigid metal clips 114 and 116 which are respectively fixed to the rearward ends of side walls 104 and 105. Clips 114 and 116 each are provided with a depending section 118 which is spaced laterally outwardly from and in parallel relation with its respective side walls 104 and 105. When side walls 104 and 105 are swung to positions where they are parallel with side walls 44 and 46 of casing 36, the width extending across side walls 104 is somewhat less than the distance between walls 44 and 46 so that when casing 102 is mounted on casing 36, the lower marginal edges of side walls 104 are received in chamber 38 closely adjacent to the inwardly facing surface of side walls 44 and 46 in the manner shown in FIGURE 13. In the mounted position of rotisserie 100 as shown in the drawings, horizontal sections 119 (see FIGURE 13) of clips 114 and 116 seat on the upper marginal edges of side walls 44 and 46 of casing 36 with clip sections 118 extending downwardly on the outside of casing 36 in overlapping relation to the upper marginal edges of side walls 44 and 46. Thus, by abutting engagement of clip sections 118 with the outside faces of walls 44 and 46 and by abutting engagement with the lower marginal edges of side walls 104 and 105 with the inner faces of side walls 44 and 46, side walls 104 and 105 are retained in parallel relation with side walls 44 and 46 of casing 36. The forward end of casing 102 is supported by separable seating engagement of front wall 106 on the top edge of front wall 40 of casing 36. Casing 102, as shown in FIGURE 4, is undercut along its lower front edge to define forwardly facing shoulder surfaces 120. Shoulder surfaces 120 abut front wall 40 of casing 36 to prevent forward displacement of casing 102 from the position shown in FIGURES 1 and 4.

From the foregoing casing construction, it is clear that casing 102 is free of attachment with respect to casing 36, thus permitting removal of rotisserie 100 simply by raising casing 102 upwardly until sections 118 of clips 114 and 116 clear the upper edges of side walls 44 and 46 of casing 36.

As best shown in FIGURE 3, a meat-supporting spit assembly 122 is detachably mounted on casing 102 and comprises a pair of multiple pronged forks 124 and 126 which are removably fixed on a rod 128 extending through side walls 104 and 105 of casing 102 and rotatably supported by an unshown casing-supporting bearing. The end of rod 128 protruding beyond side wall 104 is operatively connected to an axially disengageable coupling 129 (FIGURE 3) to a drive shaft of a conventional electric motor 130. Mounting clips 132 slidably support motor 130 on guide rails formed rigid with a motor-mounting bracket 134 which is fixed to the exterior side of side wall 104. Energization of motor 130 rotates rod 128 about an axis substantially at right angles to a plane containing side wall 104 and transversely of the flow of hot gases through the interior of casing 102 in a manner to be described in greater detatil later on.

With continued reference to FIGURE 3, rod 128 extends through an upwardly opening slot 142 (see FIGURES 4 and 12) formed in side wall 105. In its operative position, rod 128 is rotatably seated in an enlarged socket portion 144 (see FIGURE 12) formed at the lower end of slot 142. A handle 146 is suitably fixed to the outer end of rod 128 protruding beyond side wall 105 to enable meat or other comestibles secured to forks 124 and 126 to be manually rotated. When rotisserie 100 is removed from the apparatus of this invention for storage, rod 128 may be axially withdrawn to disconnect spit assembly 122 from the drive shaft of motor 130. Motor 130 then may be removed simply by sliding it upwardly along bracket 134.

To spit meat and the like, the entire assembly of rod 128 and forks 124 and 126 is axially moved a sufficient distance to clear engagement with the drive shaft of motor 130 as well as bracket 134 and wall 104 and then is raised upwardly through slot 142. The meat is impaled on rod 128 and secured in place with forks 124 and 126. The entire assembly with the meat is then reinserted in its above described operative position. Grease drippings from the impaled meat are collected in tray 32 and prevented from entering firebox 26 in the same manner described for preparing food on grill 54.

To cover the open top of casing 102, a rectangular lid 150, as best shown in FIGURE 3, is secured along its rearward edge to a horizontal plate 154 by a hinge 152. Plate 154 extends forwardly from the upper edge of rear wall 42 of casing 36 and is fixed at opposite sides to side walls 44 and 46. The axis of hinge 152 extends parallel to the aligned axes of shafts 128 and 140. Lid 150 is moved to an open position by swinging it rearwardly and upwardly from the position shown in the drawings. Owing to the rearwardly tapered side walls 104 and 105 of casing 102, the front end of lid 150 is tilted upwardly in its closed position.

With continuing reference to FIGURES 1 and 3, a handle 156 preferably having a gripping section made from Bakelite or other suitable insulating material is secured to the forward end of lid 150. The front and side marginal edges of lid 150 are turned downwardly to define flanges 155 which overlap side walls 104 and 105 and front wall 106 when lid 150 is swung to its closed position. Advantageously, a tempered glass window (not shown) may be mounted in lid 150 so that the cooking area may be viewed without opening the lid.

To remove rotisserie 100 when it is desired to use grill 54, lid 150 is first raised to an opened, rearwardly swung position, and rotisserie 100 is simply lifted vertically upwardly until clips 114 and 116 clear the upper edges of casing 36.

After removing rotisserie 100, lid 150 now may be swung downwardly, as shown in FIGURE 5, to cover the open top of casing 36 where the flanges 155 of lid 150 overlap the upper marginal edges of side walls 44 and 46 and front wall 40 of the cooking unit casing. Accordingly, it is clear from this construction that lid 150 serves to cover the top opening of casing 36 when rotisserie 100 is removed in addition to covering the top opening of casing 102 when rotisserie 100 is mounted in place on top of cooking unit 22.

To provide a natural draft through firebox 26 and to circulate the hot combustion gases through cooking chamber 38 and also through the interior of casing 102 when rotisserie 100 is mounted in place on top of cooking unit 22, plate section 154, as best shown in FIGURES 3 and 4, is formed with a row of circular apertures 160 (FIGURE 4) extending transversely between the sides of casing 36. Apertures 160 are uniformly spaced apart and are preferably of equal diameters. Damper assembly 28 comprises a manually adjustable damper slide 162 in the form of a flat-sided plate which is slidably supported on plate 154 for limited displacement along a path extending parallel to the rotational axis of hinge 152 by a pair of parallel, upstanding posts 164 and 166. Posts 164 and 166 are fixed to plate 154 and extend with a sliding fit through elongated apertures 168 and 170 formed in slide 162. Slide 162 is formed with a row of circular apertures 172 which are capable of registering with apertures 160 and which are preferably equal in number and diameter to apertures 160. By transversely shifting slide 162 between positions limited by abutment of posts 164 and 166 with the edges of apertures 168 and 170, the area of apertures 160 in registry with apertures 172 may be varied to adjustably control the draft through cooking unit 22 and also through rotisserie 100 when the latter is mounted on cooking unit 22.

With continued reference to FIGURES 3 and 4, the forward marginal edge of slide 162 is turned upwardly and rearwardly to define a baffle 174 extending at right angles between parallel sides plates 176 and 178. Baffle 174 produces an additional chimney effect for increasing the flow of heated gases through the apparatus, especially when the entire apparatus is placed with its back facing the wind. This additional draft produced by baffle 174 reduces the required cooking time.

With rotisserie 100 mounted in place on casing 36 as shown in FIGURE 5, the hot gases produced by burning fuel in firebox 26 flow upwardly through opening 50 at the forward end of chamber 38, circulate through cooking chambers 38 and 111, and pass outwardly through apertures 160 and 172 at the upper rearward end of chamber 38. To assist in the circulation of combustion products through chambers 38 and 111, front walls 40 and 106 of casings 36 and 102 respectively are inclined rearwardly at similar slopes to guide gases rearwardly in a direction generally shown by the arrows in FIGURE 4.

As best shown in FIGURE 4, the front portion of the inner surface of lid 150 faces the open top of firebox 26. With this construction, the heat of the fire in firebox 26 is reflected downwardly by lid 150 to cook meat in either chamber 36 or chamber 111 by radiant energy as well as by intimately contacting the food to be prepared by the hot combustion gases.

From the foregoing construction it will be appreciated that apertures 160 in plant section 154 and apertures 94 in plates 78 and 80 of firebox 26 essentially constitute the only openings through which air may enter the barbecue apparatus of this invention. Thus, when a fire is burning in firebox 26 to establish a natural draft, air essentially enters only through apertures 94, and the oxygen in this air is burned out as it passes upwardly through the fuel bed in the firebox. As a result, the gaseous combustion products entering and filling cooking chambers 38 and 111 do not contain sufficient oxygen to support combustion when lid 150 is closed. If a flame-up should occur through splattering or other abnormal conditions when lid 150 is open, the lid only need be dropped to its closed position to snuff out the fire in chambers 38 or 111.

When rotisserie 100 is removed and lid 150 is closed to cover the open top of casing 36 as shown in FIGURE 5, gaseous combustion products entering from opening 50 circulate upwardly and rearwardly around the food on grill 54 and pass outwardly through apertures 160. Thus, food supported on rack 56 is cooked by contact with the rearwardly flowing gaseous combustion products and also by the radiant energy reflected by lid 150.

Referring back to FIGURES 1 and 3, the cooking apparatus of this invention complete with cooking unit 22, rotisserie 100, and firebox 26 are supported above the ground or other surface by a pair of rigid U-shaped tubular legs 182 and 184 disposed at the forward and rearward ends of casing 36 and each comprising a pair of parallel arm portions 186 and 188 rigidly joined together by a transversely extending, straight cross piece 190. Arm portions 186 and 188 of each leg respectively terminate in thin, flat-sided end sections 192 (FIGURE 1) and 194 (FIGURE 3) which are pivotally secured by pins or rivets 196 to walls 44 and 46 on opposite sides of casing 36.

In their supporting positions shown in FIGURE 1, portions 186 and 188 of legs 182 and 184 extend downwardly from casing 36, and cross piece 190 rests on the ground or other surface. Leg 182 is releasably locked in its supporting position by assemblies generally indicated at 189 and 199. Assembly 198, as shown in FIGURES 1–3, comprises a clip 200 fixed to casing 36 and having a section spaced outwardly from the casing side wall to define a groove which slidably receives end sections 192.

End section 192, as best shown in FIGURE 2, is formed with a rearwardly opening slot 202 which slidably receives a bolt 204 extending through side wall 44 and clip 200. A wing nut 206 threaded on the outer end of bolt 204 is tightened to securely clamp end section 192 between the outer face of side wall 44 and the opposed surface of clip 200. Assembly 199 for clamping end section 194 of leg 182 is of the same construction as assembly 198, like reference numerals being used to identify like parts.

Leg 184 is releasably clamped in its supporting position shown in FIGURE 1 by clip and bolt assemblies of the same construction just described for leg 182. Accordingly, like reference numerals have been used to designate like parts.

To conveniently transport the apparatus of this invention complete with cooking unit 22 and rotisserie 100, wing nuts 206 are unthreaded to loosen sections 192 and 194 of legs 182 and 184. Legs 182 and 184 are then swung outwardly and upwardly about the axes of pins 196. As shown in FIGURES 1 and 2, arm portions 186 and 188 are made sufficiently long so that the cross pieces 190 of legs 182 and 184 are freely swingable about the forward and rearward ends of casing 36 to side-by-side abutting positions disposed centrally above rotisserie 100. Cross pieces 190 thus provide gripping surfaces by which cooking unit 22 and rotisserie 100 may be lifted with one hand to be carried from one location to another. It will be appreciated that before moving the apparatus, firebox 26 or rotisserie 100, or both may be removed if desired. Preferably, for storage in a car trunk or station wagon, or other location, firebox 26 is removed so that cooking unit 22 with or without rotisserie 100 may seat on the flat bottom surface of casing wall 48. The sheet metal casing construction of apparatus 20 provides for a comparatively lightweight construction to reduce the carrying load.

FIGURES 14 and 15 illustrate another damper assembly wherein damper slide 162 of assembly 28 is replaced with a modified slide indicated at 210. Slide 210 comprises a flat-sided metal plate formed with a row of circular apertures 211 which are capable of registering with apertures 160 and which are preferably equal in number to and have the same diameters as apertures 160. Posts 164 and 166 extend with a sliding fit through apertures 212 and 214 in slide 210 to guide and limit lateral displacement of slide 210 in the manner described in the previous embodiment.

In the damper embodiment shown in FIGURES 14 and 15, baffle 174 is omitted, and ears 214 and 216 extend upwardly from the side edges of slide 210 to provide a gripping surface for enabling the registration of apertures 211 and 160 to be varied for manually adjusting the draft.

FIGURES 16 and 17 illustrate a further modified damper assembly having a hinged, imperforate damper plate 220 in place of the previously described damper slides. In this embodiment, plate 154 is replaced with a narrow imperforate top plate 222 which is suitably fixed to or formed rigid with side walls 44 or 46 of casing 36 and which is spaced forwardly of wall 42 to cooperate with walls 42, 44, 46 to define a rectangular upwardly facing draft opening 224 in the top of casing 36. Hinge 152 for mounting lid 150 is secured to the forwardly facing edge of plate 222.

With continued reference to FIGURES 16 and 17, damper plate 220 is secured by a suitable, conventional hinge 226 to the rearwardly facing edge of plate 222. The swing axes of hinges 226 and 152 are parallel as shown. Damper plate 220 is manually swingable upwardly and forwardly from a closed horizontal position covering opening 224 to a raised position as shown in the drawings for adjusting the area of opening 224 through which gaseous combustion products may flow. Hinge 226 provides frictional engaging surfaces to retain damper plate 220 in an adjusted upwardly tilted position.

With continued reference to FIGURES 16 and 17, the marginal side edges of damper plate 220 are turned downwardly defined flanges 228 (one shown) which overlap the oppositely facing outer side wall surfaces of casing 36 when damper plate 220 is swung to its closed position. To provide a gripping surface for swinging damper plate 220 about the axis of hinge 226, a tab 230 having a rigid upstanding section 232 is suitably fixed to plate 220. In this embodiment, a baffle 234 comprising a flat-sided plate is formed rigid with and extends upwardly from the top edge of rear wall 42 of casing 36.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the means and range of equivalency of the claims are therefore intended to be embraced therein.

What is claimed and desired to be secured by Letters Patent is:

1. In an apparatus for barbecuing, smoking, curing, or broiling foods,
   (a) a first casing having an open top and defining a first cooking chamber for receiving food to be prepared,
   (b) second casing having an open top and defining a second coking chamber,
   (c) means for detachably mounting said second casing on said first casing,
   (d) means for heating and effecting flow of air through said first chamber and then through said second chamber when said second casing is mounted on said first casing, and
   (e) a lid mounted on said first casing for covering the open top thereof when said second casing is detached and for covering the top of said second casing when mounted on said first casing.

2. In combination with a barbecue apparatus having a casing defining an enclosed cooking compartment compartment for receiving food to be prepared, a fuel-receiving firebox supported by said casing and communicating with said compartment, and means defining at least one draft opening in said casing for exhausting combustion gases which enter and circulate in said compartment from said firebox,
   (a) an attachment unit in the form of a rotisserie and having a casing structure for defining a rotisserie cooking compartment,
   (b) means separably mounting said attachment with unit on said apparatus to combine said cooking compartments into a single chamber, and
   (c) means for enclosing said chamber for exhausting the combustion gases entering said chamber from said firebox through said at least one draft opening.

3. In combination with a barbecue apparatus having a casing formed with a top access opening and defining a first cooking compartment for receiving food to be prepared and a fuel-receiving firebox communicating with said compartment,
   (a) an attachment unit in the form of a rotisserie having a casing formed with top and bottom openings and delimiting a second cooking chamber for receiving food to be prepared,
   (b) means removably supporting said attachment unit casing on said apparatus casing with the top opening of said apparatus casing in registry with the bottom opening of said attachment unit casing to combine said first and second cooking compartments into a single chamber,
   (c) a lid, and
   (d) means swingably securing said lid to said apparatus casing to cover the top opening of said attachment unit casing when supported on said apparatus casing and for covering said top opening of said apparatus casing when said attachment unit is removed.

4. The combination defined in claim 3 wherein said attachment unit casing is formed of a pair of side walls and a cross wall hinged to corresponding ends of said side walls and wherein a rotatable, meat-supporting spit assembly is removably mounted in said attachment casing, said side walls being foldable about their hinge connections to said cross wall when said unit is removed from said apparatus and when said spit assembly is removed from said attachment unit casing.

5. The combination defined in claim 4 wherein said means supporting said attachment unit casing comprises at least one pair of members fixed one to each of said side walls and cooperating with the casing of said apparatus to position each of said side walls at a predetermined angle with respect to said cross wall.

6. The combination defined in claim 5 comprising:
   (a) a motor operatively connected to rotate said spit assembly, and
   (b) means detachably mounting said motor on said attachment unit casing.

7. The combination defined in claim 6 wherein said spit assembly extends transversely between said side walls and wherein said means mounting said motor comprises a bracket fixed to one of said side walls and mounting means fixed to said motor for sliding the latter along said bracket.

8. In a barbecue apparatus:
   (a) a casing formed with a top access opening and defining a first cooking compartment for receiving food to be prepared;

(b) a fuel receiving firebox having a combustion chamber communicating with said compartment, (c) an attachment unit in the form of a rotisserie having a casing formed with an open top and an open bottom and including a pair of side walls extending rearwardly from a front wall;

(d) said side walls being of triangular shape tapering in a direction extending rearwardly from said front wall;

(e) means removably supporting said attachment unit casing on said apparatus casing with said open bottom in registry with said top access opening;

(f) a lid, and (g) means hinging said lid to said apparatus casing rearwardly of said top access opening to cover said open top when said attachment unit casing is mounted on said apparatus casing and to cover said top access opening when said attachment unit is removed.

9. In an apparatus for barbecuing, smoking or broiling foods, (a) a casing defining a cooking compartment for receiving food to be prepared;

(b) a bottom wall forming a part of said casing and having an opening therein;

(c) an upwardly opening firebox, and (d) means removably suspending said firebox in depending relation below said bottom wall and in registry with said openings;

(e) said means comprising parallel inwardly turned, horizontal flanges formed rigid with said casing and extending along opposite sides of said opening below said bottom wall and along opposite sides of said firebox adjacent to the upper end thereof, and (f) laterally oppositely extending flanges formed rigid with said firebox and being slidably seated on the flanges of said casing to support said firebox from said casing flanges and to enable said firebox to be separated from said casing by sliding it forwardly along said casing flanges.

10. In an apparatus for barbecuing, smoking or broiling foods, (a) a casing defining a cooking compartment for receiving food to be prepared;

(b) a bottom wall forming a part of said casing and having an opening therein;

(c) an upwardly opening firebox;

(d) means removably supporting said firebox in depending relation below said bottom wall and in registry with said opening, said means comprising upwardly facing surface means formed rigid with said casing and extending along opposite sides of said firebox adjacent to the upper end thereof and laterally oppositely extending flanges formed rigid with said firebox and being slidably seated on said surface means, with said surface means and said flanges being so arranged as to enable said firebox to be separated from said casing by sliding it forwardly therefrom;

(e) a grill for supporting food to be prepared and disposed in said compartment in spaced relation from said opening; and (f) means vertically below said grill for collecting grease drippings produced by cooking meats and the like and preventing said grease drippings from entering said firebox, (g) said grease dripping collecting means comprising a tray separably seated on said bottom wall;

(h) said grill being separably supported on said tray, with said casing having a top access opening enabling said grill and said tray to be removed from said compartment.

11. The apparatus defined in claim 10 wherein said grill comprises:

(a) a rack providing food supporting surfaces on opposite sides thereof, and (b) first and second sets of support legs formed rigid with and respectively extending in opposite directions from said rack;

(c) one set of said legs being uniformly longer than the other of said sets of legs to position said rack at different levels above said tray by inverting said grill.

12. The apparatus defined in claim 10 comprising:

(a) a lid for said top access opening, and (b) a hinge swingably securing said lid to said casing.

13. The apparatus defined in claim 12 comprising:

(a) a damper assembly for controlling the draft through said firebox and said cooking compartment;

(b) and a rigid top section forming a part of said casing and mounting said damper assembly and said hinge.

14. The apparatus defined in claim 13 wherein:

(a) said top section is formed with at least one aperture for exhausting gaseous combustion products from said cooking compartment, and wherein (b) said damper assembly comprises a damper plate having at least one aperture cable of registry with the aperture in said top section and being slidably supported on said top section to adjust the registry between said apertures in said top section and said damper plate.

15. The apparatus defined in claim 14 comprising a baffle formed rigid with said damper plate for directing outwardly flowing gases away from the front end of said casing.

16. The apparatus defined in claim 15 wherein said damper plate is disposed rearwardly of said lid and wherein said top section delimits the forwardly facing edge of said top access opening.

17. The apparatus defined in claim 13 wherein said casing is formed with a top draft opening spaced rearwardly from said top access opening and wherein damper assembly comprises a plate hinged to said casing for controlling the flow of gaseous combustion products through said draft opening.

18. The apparatus defined in claim 13 comprising:

(a) an attachment unit in the form of a rotisserie and having a housing defining a food receiving compartment;

(b) means removably supporting said housing on said casing;

(c) said housing being formed with an open bottom registerable with said top access opening and with an open top adapted to be covered by said lid.

19. An apparatus for barbecuing, smoking, curing, or broiling food comprising a first casing defining a first cooking compartment, grille means for supporting food to be cooked within said compartment, a fuel receiving firebox secured to said first casing for introducing combustion gases into said compartment for circulation around the food supported by said grille means, a second casing adapted to be detachably mounted on said first casing and defining a second cooking compartment, rotisserie means mounted on said second casing for supporting food to be cooked in said second compartment, said first and second casing having opposed openings which register with each other when said second casing is mounted on said first casing to combine said first and second compartments into a single chamber through which the combustion gases from said firebox are circulated to intimately contact food carried by said rotisserie means and said grille means, means for enclosing said first compartment when said second casing is removed from said first casing and for enclosing said chamber when said second casing is mounted on said first casing to confine the combustion gases during the cooking of said food, and means providing at least one draft opening only in said first casing for venting combustion gases from said chamber when said second casing is mounted on said first casing and from said first compartment when said second casing is removed from said first casing.

References Cited

UNITED STATES PATENTS

| | | | |
|---|---|---|---|
| 2,663,391 | 12/1953 | Kuhns | 99—421 X |
| 2,715,870 | 8/1955 | Rutowski | 99—421 |
| 2,815,707 | 12/1957 | Morrow | 99—421 |
| 3,124,057 | 3/1964 | Kiser | 99—421 |
| 3,140,651 | 7/1964 | Barnett | 99—419 |
| 3,247,827 | 4/1966 | Cremer | 99—421 |

WALTER A. SCHEEL, *Primary Examiner.*

ROBERT W. JENKINS, *Examiner.*